Dec. 15, 1964 E. B. YEAGER ETAL 3,161,546
CONTINUOUS FEED PRIMARY BATTERY
Filed Dec. 14, 1959 3 Sheets-Sheet 1
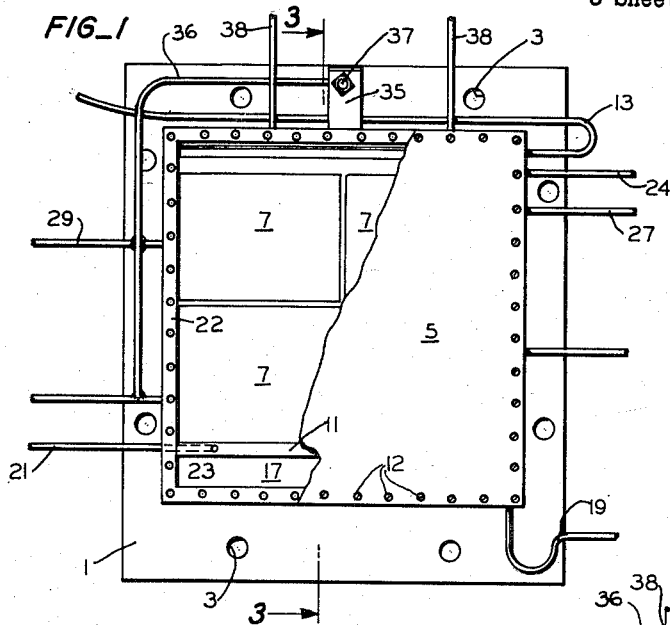
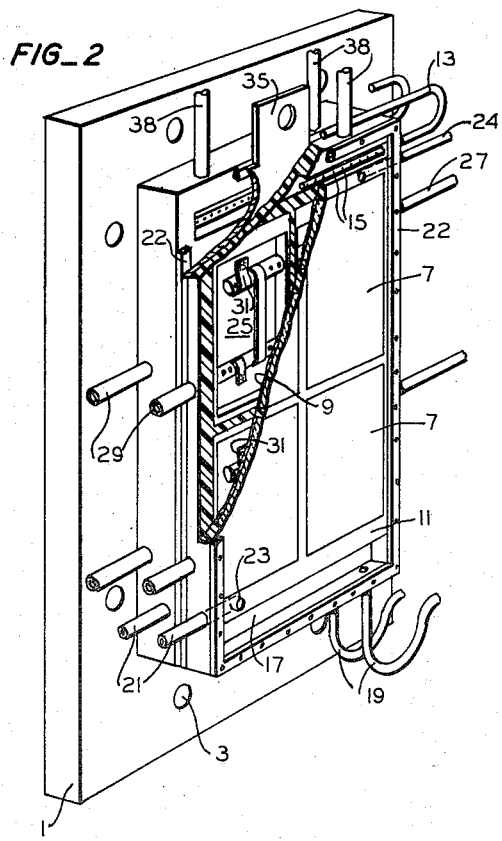
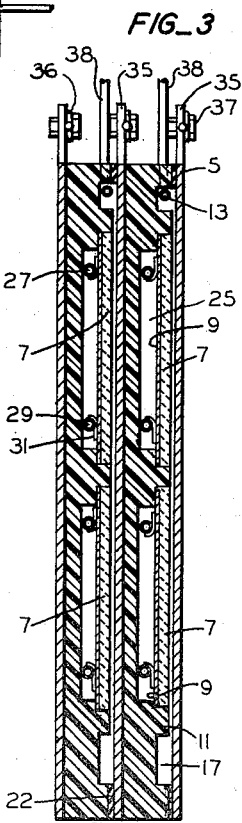
INVENTORS
HARRY J. DIETRICK
ROMEO R. WITHERSPOON
ERNEST B. YEAGER
BY
*Paul M. Klein Jr.*
ATTORNEY

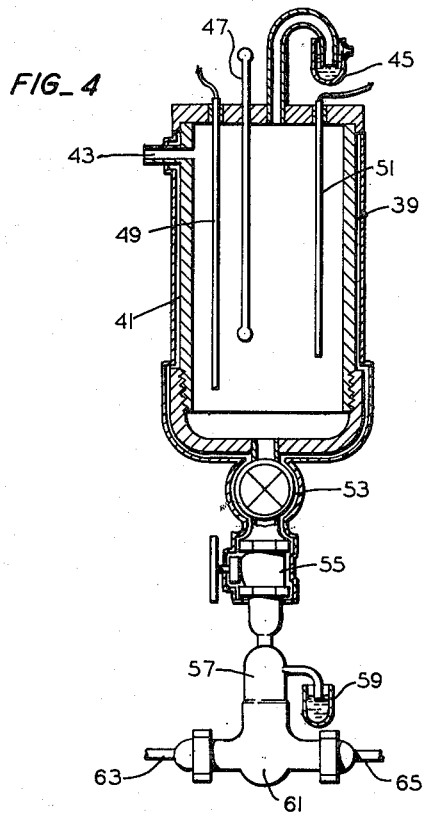
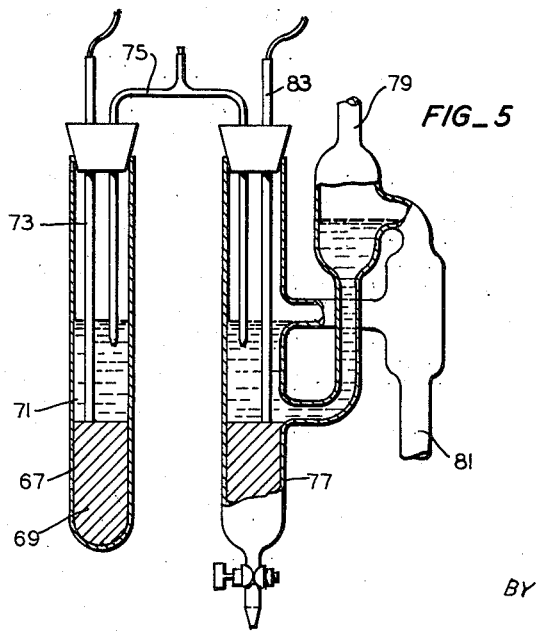

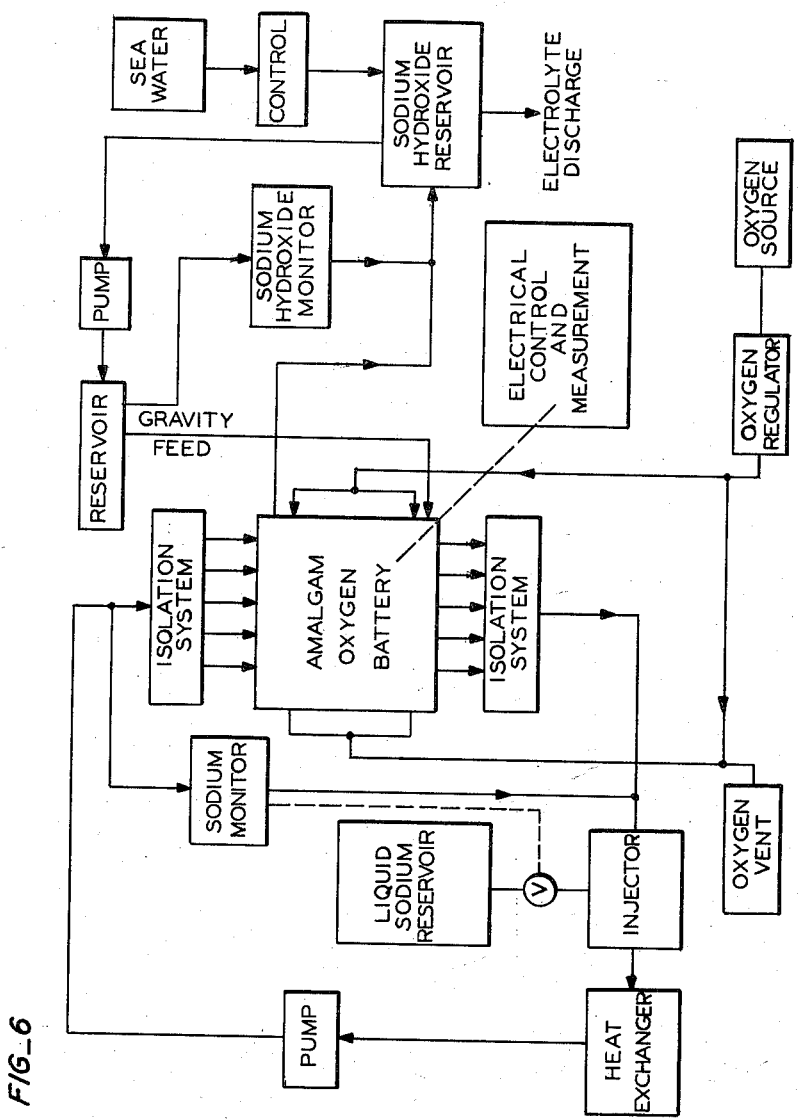
FIG_6

United States Patent Office 3,161,546
Patented Dec. 15, 1964

3,161,546
CONTINUOUS FEED PRIMARY BATTERY
Ernest B. Yeager and Harry J. Dietrick, Cleveland, and Romeo R. Witherspoon, Medina, Ohio, assignors, by mesne assignments, to the United States of America as represented by the Secretary of the Navy
Filed Dec. 14, 1959, Ser. No. 859,542
4 Claims. (Cl. 136—86)

This invention relates to a primary battery and more particularly to a continuous feed primary battery and a system for operating the battery.

An object of this invention is to provide a continuous feed primary battery particularly useful for high current and high energy demand situations such as for submarine propulsion.

Other objects and many of the attendant advantages of this invention will be readily appreciated as the same becomes better understood by reference to the following detailed description when considered in connection with the accompanying drawing wherein:

FIG. 1 is a front elevation view, partially broken away, of a battery constituting a preferred embodiment of the invention;

FIG. 2 is an axonometric view of a portion of the battery of FIG. 1, partially broken away and showing one complete cell and part of another cell;

FIG. 3 is a cross section along the line 33 in FIG. 1, showing two complete cells and part of a third cell;

FIG. 4 is an elevation view partly in cross section showing a liquid alkali metal reservoir and injector arrangement for supplying liquid alkali metal to the battery of FIG. 1;

FIG. 5 is an elevation view, largely in cross section, of a monitor for monitoring the electrolyte supplied to the battery of FIG. 1; and FIG. 6 is a block diagram showing the entire system for operating the battery of FIG. 1.

The battery of the present invention uses the primary cell composed of a liquid alkali metal amalgam, in a preferred embodiment being sodium amalgam, an alkali hydroxide electrolyte, in the preferred embodiment being sodium hydroxide, and a cathodic gas, in the preferred embodiment being oxygen, used in the presence of carbon. The anode comprises a vertical metal electrode with a flow of liquid amalgam directed down the surface, the metal being such as to be wet by the amalgam but not attacked by it. The cathode involves the use of an air-cell type carbon electrode with the cathodic gas, for example oxygen, introduced through the rear of the electrode. The cell generates its own electrolyte and can use sea water.

Reference is now made to the drawing for an understanding of a particular preferred embodiment of the invention. FIGS. 1, 2 and 3 show selected views of portions of a battery composed of a plurality of cells conveniently clamped together between plastic outer frame pieces 1 held together by bolts passing through holes 3. Each cell comprises a metal plate 5, made of any suitable metal such as low carbon steel which has adequate conductivity and is not attacked by mercury. Opposite this metal plate are a plurality of active carbon porous blocks 7 backed with perforated plates of steel or other good conductor 9. The carbon blocks are conveniently held by plastic cement in a plastic frame 11. The carbon blocks are conveniently held by plastic cement in a plastic frame 11. The plate 5 is held to the frame 11 by a plurality of screws 12. A tube 13 of Lucite or the like having a plurality of small holes 15 is used to spray liquid alkali-amalgam against that surface of the metal plate 5 which faces the carbon block 7. A chamber 17 is formed at the lower end of the metal plate 5 where amalgam can accumulate without contacting the carbon blocks 7. A tube 19 is provided for withdrawing amalgam from this chamber. Alkali-metal hydroxide electrolyte is supplied through tube 21 to the interior of the cell filling the space between the opposite faces of the metal plate and carbon blocks. A gasket 22 seals the joint between plate 5 and frame 11 to prevent leakage of amalgam and electrolyte. Conveniently, the tube 21 can enter a bore in the lower portion of the plastic frame 11 and discharge through a connecting bore formed therein as shown at 23. Excess electrolyte is drawn off through similarly arranged tube 24. A chamber 25 is formed behind each carbon block and receives oxygen from pipes 27 which are perforated along that portion of their length lying in the chamber 25. The unused oxygen is withdrawn from the lower portion of the chamber through pipes 29. The oxygen pipes serve as the electrical connection for one terminal of each cell and therefore are placed in good electrical contact with the carbon blocks 7 by means of metal tabs such as 31 soldered to the perforated steel backing 9 formed on the carbon block 7. A tab 35 formed on the plate 5 constitutes an electrical connection providing the other terminal of the cell. The series connection of the cells is accomplished by means of external conductors, shown as being conveniently of copper tubing 36 fastened to the tabs 35 by bolts 37. The space between plate 5 and the carbon blocks is vented by vents 38.

In FIG. 6 is shown the battery of FIGS. 1, 2 and 3 embodied in a system for maintaining it continuously in operation. Partially depleted amalgam leaving the cells of the battery from tubes 19, as previously explained, passes through an isolation system preventing any shortcircuiting of the several cells, and enters an injector where additional sodium is added to restore the amalgam to maintain the amalgam at an optimum sodium concentration. The amalgam then passes through a heat exchanger to remove the undesired heat of reaction. From the heat exchanger, the enriched amalgam is delivered by a pump into the upper region of the battery through the aforementioned nozzles 15, passing on its way through an isolation system to permit of feeding each cell with amalgam without shorting out the series arrangement of cells. The isolation systems used may be of any convenient type which permits the flow of amalgam to each individual cell without shorting out the series arrangement of cells. A simple construction for upper isolation system is a manifold from which depend vertically a plurality of separate conduits, each provided with a solenoid valve, and each conduit dropping its contents into a reservoir connected with only one cell of the battery. A mechanical switch can be used to open each solenoid valve, one at a time, thus obtaining the interruption of the amalgam flow necessary for electrical isolation between cells. A similar arrangement is used in the amalgam discharged from each cell. Other obvious isolation arrangements are equally useful such, for example, as a multi-compartment mechanical interruption valve assembly.

The output of the pump feeding into the battery is monitored by a sodium monitor including a monitoring cell similar to the electrolyte monitor hereinafter described and illustrated in FIG. 5. The output of the monitoring cell in conjunction with a recording potentiometer controls a solenoid valve V which delivers the proper amount of sodium from the reservoir to the injector. The sodium injection system, shown in detail in FIG. 4, comprises a reservoir generally indicated at 39 heated by means of a jacket 41 to maintain the sodium in liquid form. To prevent oxidation of the sodium, inert gas is supplied to the reservoir through inlet 43. The inert gas escapes through a bubbler 45. A thermometer 47 is used to check the temperature of the sodium. Control contacts 49 and 51 are used in the cell protection and alarm system. The sodium leaves the reservoir at the lower end passing first through a solenoid valve 53 and then needle valve 55 whence it enters a sight glass 57 provided with a pressure release 59. In the fitting 61 the sodium from the reservoir 39 is added to the amalgam coming from the cell entering the fitting 61 through pipe 63. The enriched amalgam leaves the fitting 61 through pipe 65 for future passage into the heat exchanger shown in FIG. 6.

The monitoring system for sodium hydroxide as shown in FIG. 5 comprises a first container 67 provided with a supply of .3% amalgam 69 over which floats a supply of 3 molar NaOH as at 71. This container 67 is provided with a platinum electrode 73. A saturated KCl bridge 75 connects the container 67 with a second container 77 into which the electrolyte leaving the battery is conducted through tube 79. The electrolyte leaves the monitoring system through tube 81. A second platinum electrode 83 is provided in the chamber 77.

Oxygen gas from the oxygen source is fed to the cells through a single stage pressure regulator followed by a needle valve assembly. The top carbons in all the cells are connected in parallel as are the bottom carbons. A hydrostatic type control-vent system is used to keep the oxygen gas at the rear surface of the top set of carbon electrodes and the bottom set at a pressure equivalent to one inch of water in excess of the hydrostatic pressure at the bottoms of the respective sets of carbon electrodes. This control-vent system is automatic in that it functions regardless of the electrolyte level in the cell. The slight excess of pressure helps to prevent any possible leakage through any small cracks that may remain after sealing the carbon electrodes in the plastic frame.

The electrolytic solution within the cells is circulated by means of a pump with a relatively large container as the main storage reservoir labeled "sodium hydroxide reservoir." A smaller container labeled simply "reservoir" with an overflow is used as the gravity-feed reservoir for the system in order that the flow of electrolyte through the cell will be independent of the pumping rate. A container, conveniently of sea water, is used to supply liquid for diluting the electrolytic solution. The introduction of sea water into the system is controlled by a solenoid valve. The operator turns this valve on or off electrically in terms of the voltage from the sodium hydroxide monitoring cell in the electrolyte flow system.

*Operation*

The operation of the battery and battery system of this invention can perhaps best be understood by first considering the electrode processes in each cell. Although other materials for the electrodes can be used, this explanation will be based on the illustrated preferred embodiment which uses an oxygen cathode and a sodium amalgam anode. The anodic reaction is simply the oxidation of the sodium in the amalgam: i.e., $Na \rightleftharpoons Na^+ + e^-$. This reaction is reversible for all practical purposes at the current densities which are involved in the contemplated applications of the cell embodied in the present invention. As previously indicated, the cathode reaction takes place at a special carbon electrode of the "air cell" type and involves the reduction of oxygen gas to hydroxyl ions through a peroxide intermediate: i.e., (a)     $O_2 + H_2O + 2e^- \rightleftharpoons HO_2^- + OH^-$ (b)     $HO_2^- + OH^- \rightarrow \tfrac{1}{2}O_2 + 2OH^-$ Step (a) is nearly reversible while step (b) is irreversible. The latter, however, does not inovlve additional electrons, and hence, does not contribute directly to the electrochemical energy. The oxygen liberated in step (b) is ordinarily recycled through step (a). Thus, the overall cathode reaction may be written as (c)     $O_2 + 2H_2O + 4e^- \rightarrow 4OH^-$ and four electrons obtained per oxygen molecule.

To operate the battery, an initial supply of sodium amalgam is provided with a sodium content between 0.45% and 0.50% by weight. Additional sodium is stored in the heated reservoir 39 as a liquid at about 120° C. and so maintained by keeping the reservoir heated. An initial supply of 3-molar sodium hydroxide solution is provided as the electrolyte. Although this is not the concentration for maximum conductivity, it has been chosen as the approximate preferred operating concentration because the lower activity for sodium ion helps prevent the formation of sodium peroxide in the carbon electrodes. Oxygen from any convenient source, such as bottled oxygen or oxygen available from the decomposition of hydrogen peroxide, is supplied through tubes 27 to the chamber 25 behind each carbon block. The carbon blocks preferably include a catalyst such as silver to decompose any peroxide that may be formed in the carbon cathode.

With both pumps operating, the following sequence of events takes place. Amalgam is supplied through the upper isolation system individually to each cell of the battery through the nozzles 15 from which it is sprayed against the inner surface of the steel plate 5, down the surface of which it runs quite readily, since it thoroughly wets the steel plate because of the low surface tension of the amalgam. Partially depleted amalgam collects in the chamber 17 and from there it is drawn off through tubes 19 to pass through the injector on its way to the amalgam pump inlet. In the injector, shown in FIG. 4, the amalgam entering the fitting 61 through pipe 63 is enriched by liquid sodium added through needle valve 55 under control of the solenoid valve 53 to which it is admitted by solenoid valve 53. The solenoid valve 53 is controlled by the sodium monitor which monitors the amalgam entering the battery to maintain the amalgam concentration of about .5% by weight of sodium.

Since the addition of sodium to mercury is a highly exothermic process, the heat of solution must be dissipated. This is accomplished in the heat exchanger through which the enriched amalgam passes before entering the amalgam pump. When the sodium in the reservoir 39 reaches a predetermined low level, the electrical contacts 49 and 51 cause actuation of an alarm system which notifies the operator to refill the reservoir and also shuts off the battery before all of the sodium is consumed.

Oxygen is continuously supplied through tubes 27 passing through the perforated plates 9 and carbon blocks 7 to provide the cathodic reaction. Control vents 38 maintain the desired oxygen pressure and excess oxygen leaves the cells through tubes 29 which, as previously indicated, also serve as points of electrical connection.

The sodium hydroxide electrolyte is maintained at the desired concentration by dilution with sea water under control of the sodium hydroxide monitor, the cell of which is shown in detail in FIG. 5. Excess electrolyte is withdrawn from the main sodium hydroxide reservoir to be discarded at convenience. No attempt has been made to remove the magnesium hydroxide which forms during the operation of this system on sea water. Even with the slightest circulation, the material remains in suspension.

The sodium amalgam-oxygen primary cell, hereinbefore described in the preferred embodiment of the invention, exhibits the following advantages particularly desirable in special propulsion applications:

The anodic polarization is virtually zero and the cathodic polarization relatively low even at high current densities (e.g., $<0.2$ volt at 150 amp./ft.$^2$). The cell voltage is relatively high compared to some more conventional primary cells (1.95 volts at zero load). The self discharge of the liquid sodium amalgams is very small in alkaline solution (equivalent to 100 ma./ft.$^2$ or less under ordinary circumstances). The electrolyte, sodium hydroxide, is produced directly by the electrode reactions. The specific conductance of the electrolytic solution is relatively high (0.37 mho/cm. at 25° C.) since concentrated sodium hydroxide is used as the electrolyte. Sea water is satisfactory for use in such a cell. The equivalent weights of the electroactive materials are relatively low (31 g./faraday in terms of oxygen and sodium or 40 g./faraday in terms of hydrogen peroxide as the source of oxygen). When atmospheric oxygen is available, the cell can be operated on air, although not at as high a current density as with pure oxygen. Inasmuch as this is a fully continuous-feed primary cell, the electrochemical "fuels" need not be carried in the cell but can be stored elsewhere.

Obviously, many modifications and variations of the present invention are possible in the light of the above teachings. It is therefore to be understood that within the scope of the appended claims, the invention may be practiced otherwise than as specifically described.

What is claimed is:

1. A primary cell comprising a generally vertical metal plate, an active carbon porous block facing said metal plate and spaced therefrom, means for spraying a liquid alkali metal amalgam against the upper portion of that face of said plate opposite said carbon block; a chamber at the lower end of said plate wherein said amalgam can accumulate without contacting said carbon block; means for withdrawing amalgam from said chamber; a second chamber in communication with that side of said carbon block remote from said metal plate; means for supplying a cathodic gas to the upper portion of said second chamber; means for withdrawing said gas from the lower portion of said second chamber; means for establishing an electrical connection to said metal plate; means for establishing an electrical connection to said carbon block; and means for venting the space between said plate and said carbon block.

2. A system comprising a battery constituted by a plurality of cells as in claim 1; a liquid alkali metal reservoir containing liquid alkali metal; a pump for supplying amalgam to the upper region of said battery, said pump having as its input supply partially depleted amalgam withdrawn from the lower region of said battery; a monitor for monitoring the alkali metal concentration in the amalgam supplied to said battery; means controlled by said monitor for adding alkali metal from said reservoir to the input supply to said pump to maintain a predetermined alkali metal concentration in the amalgam supplied to said battery; a cathodic gas reservoir; a regulator for maintaining at a predetermined pressure the cathodic gas supplied from said reservoir to said battery; an alkali hydroxide reservoir containing alkali hydroxide in aqueous solution; a pump for supplying alkali hydroxide from said reservoir to the lower region of said battery, alkali hydroxide being returned to said alkali hydroxide reservoir from the upper region of said battery; an alkali hydroxide monitor for monitoring the concentration of alkali hydroxide in the electrolyte supplied to said battery; and means controllable in response to the indication of said alkali hydroxide monitor for supplying diluent to said alkali hydroxide reservoir to maintain the alkali hydroxide concentration at a predetermined level.

3. The cells of claim 1 wherein said amalgam comprises sodium and said cathodic gas comprises oxygen.

4. The system of claim 2 wherein said amalgam comprises sodium and said cathodic gas comprises oxygen.

References Cited by the Examiner

UNITED STATES PATENTS

| 553,719 | 1/96 | Olan | 136—83 |
|---|---|---|---|
| 592,782 | 11/97 | Hess. | |
| 666,387 | 1/01 | Kyanston | 136—86 |
| 1,863,791 | 6/32 | Heise. | |
| 2,102,701 | 11/33 | Hyuris | 136—83 |
| 2,832,814 | 4/58 | Shannon | 136—90 |
| 2,912,478 | 11/59 | Justi et al. | 136—86 |
| 2,921,110 | 1/60 | Crowley et al. | 136—86 |
| 2,932,681 | 4/60 | Solomon | 136—160 |
| 2,970,095 | j/61 | Kandler | 136—83 X |

OTHER REFERENCES

PB–151804, Stein, Status Report, Fuel Cells, June 1959, pages 68 and 69, Office of Technical Services, Dept. of Commerce.

JOHN H. MACK, *Primary Examiner.*

ROGER L. CAMPBELL, CARL D. QUARFORTH, OSCAR R. VERTIZ, *Examiners.*